United States Patent
Uneda

(10) Patent No.: US 11,179,789 B2
(45) Date of Patent: Nov. 23, 2021

(54) ELECTRIC DISCHARGE MACHINING DEVICE

(71) Applicant: Sodick Co., Ltd., Kanagawa (JP)

(72) Inventor: Ryo Uneda, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 276 days.

(21) Appl. No.: 16/244,122

(22) Filed: Jan. 10, 2019

(65) Prior Publication Data

US 2019/0262922 A1    Aug. 29, 2019

(30) Foreign Application Priority Data

Feb. 28, 2018   (JP) .............................. JP2018-034229

(51) Int. Cl.
 *B23H 1/08*    (2006.01)
 *B23H 1/10*    (2006.01)

(52) U.S. Cl.
 CPC ...................................... *B23H 1/10* (2013.01)

(58) Field of Classification Search
 None
 See application file for complete search history.

(56) References Cited

U.S. PATENT DOCUMENTS

| | | | | |
|---|---|---|---|---|
| 3,067,358 A | * | 12/1962 | Frank ...................... | B23H 1/04 219/69.13 |
| 3,252,882 A | * | 5/1966 | Williams ................. | B23H 3/10 204/224 M |
| 3,417,006 A | * | 12/1968 | Inoue ....................... | B23H 5/02 205/641 |
| 4,857,688 A | * | 8/1989 | Aso .......................... | B23H 1/10 219/69.14 |
| 5,071,567 A | * | 12/1991 | Corcelle .............. | B01D 37/046 210/744 |

(Continued)

FOREIGN PATENT DOCUMENTS

| JP | S62192827 | 12/1987 |
|---|---|---|
| JP | H04171123 | 6/1992 |

(Continued)

OTHER PUBLICATIONS

Uemoto, Kazuhiko, Feeding device processing liquid for electric discharge machine, JPH04171123A, Espacenet translation, Description, Drawings. (Year: 1992).*

*Primary Examiner* — Hung D Nguyen

(74) *Attorney, Agent, or Firm* — JCIPRNET

(57) ABSTRACT

A dirty fluid tank of a machining fluid supply tank has a capacity smaller than a machining tank and is arranged lower than the machining tank. An intermediate tank has a capacity smaller than the dirty fluid tank, selectively communicates with the dirty fluid tank. A clear fluid tank has a capacity smaller than the intermediate tank, is arranged above the dirty fluid tank and the intermediate tank. The sum of capacities of the dirty fluid tank and the intermediate tank is larger than the capacity of the machining tank. A pipe includes a drain pipeline of the machining tank, a first pipeline for purifying the electric discharge machining fluid and sending the electric discharge machining fluid to the clear fluid tank, and a second pipeline for sending the electric discharge machining fluid from the clear fluid tank to the machining tank.

6 Claims, 6 Drawing Sheets

(56) References Cited

U.S. PATENT DOCUMENTS

| | | | | |
|---|---|---|---|---|
| 5,386,094 A | * | 1/1995 | Kawai | B23H 1/10 219/69.14 |
| 5,401,931 A | * | 3/1995 | Hori | B23H 7/02 219/69.11 |
| 5,972,209 A | * | 10/1999 | Shih | B01D 17/0214 210/104 |
| 6,533,927 B1 | * | 3/2003 | Hosaka | B23H 1/10 210/167.01 |
| 2005/0023195 A1 | * | 2/2005 | Kita | B23H 1/10 210/86 |
| 2012/0228201 A1 | * | 9/2012 | Kasai | B23H 1/10 210/108 |
| 2013/0161242 A1 | * | 6/2013 | Kasai | B23H 1/10 210/85 |
| 2014/0083536 A1 | * | 3/2014 | Yoshizaki | B23H 1/10 137/565.17 |
| 2017/0239741 A1 | * | 8/2017 | Furuta | B23H 1/10 |

FOREIGN PATENT DOCUMENTS

| | | | | |
|---|---|---|---|---|
| JP | H04171123 A | * | 6/1992 | B23H 7/36 |
| JP | H054117 | | 1/1993 | |
| JP | H07246520 | | 9/1995 | |
| JP | H1043955 | | 2/1998 | |

* cited by examiner

ELECTRIC DISCHARGE MACHINING DEVICE

CROSS-REFERENCE TO RELATED APPLICATION

This application claims the priority benefit of Japan Application No. 2018-034229, filed on Feb. 28, 2018. The entirety of the above-mentioned patent application is hereby incorporated by reference herein and made a part of this specification.

BACKGROUND

Technical Field

The disclosure relates to an electric discharge machining device provided with a machining fluid supply tank which includes a dirty fluid tank and a clear fluid tank. In particular, the disclosure relates to an electric discharge machining device provided with a machining fluid supply tank in which a clear fluid tank is arranged upper than a dirty fluid tank.

Related Art

In most electric discharge machining, an electric discharge machining fluid is used as a machining medium for maintaining an electric insulation degree of an electric discharge gap in a machining clearance. The electric discharge machining fluid has effects of cooling a machining portion that reaches a high temperature and removing impurities including metal machining chips generated along with the machining from the machining clearance.

Accordingly, in order to stably continue the machining for a long time, it is required that a clear electric discharge machining fluid at a prescribed temperature constantly intervenes in the machining clearance. Therefore, the electric discharge machining device which uses the electric discharge machining fluid as the machining medium is provided with a machining fluid supply tank capable of storing a necessary and sufficient amount of electric discharge machining fluid.

The machining fluid supply tank includes at least the dirty fluid tank and the clear fluid tank and can repeatedly uses a prescribed amount of electric discharge machining fluid. The machining fluid supply device includes the machining fluid supply tank and a pipe, and is configured in a manner that the electric discharge machining fluid that is subjected to the machining and thus becomes dirty is collected to the dirty fluid tank, impurities are removed from the dirty electric discharge machining fluid, then the purified electric discharge machining fluid is transferred to the clear fluid tank, and the clear electric discharge machining fluid at a prescribed temperature is supplied from the clear fluid tank to the machining tank again. In particular, when an aqueous electric discharge machining fluid mainly composed of water is used as a machining medium, a demineralizer for recovering a specific resistance declining with time is arranged in the machining fluid supply device.

In the electric discharge machining device, in order to increase an operation ratio, the electric discharge machining fluid in the machining tank is discharged from a drain to the machining fluid supply tank by a free-fall drop so that all the electric discharge machining fluid in the machining tank can be collected at a time as short as possible. The configuration in which the electric discharge machining fluid is discharged from the drain to the machining fluid supply tank by the free-fall drop is also excellent in that there is no concern that a pump fails or the pipe is damaged due to the impurities.

In order to discharge the electric discharge machining fluid in the machining tank from the drain, the machining fluid supply tank should be arranged so that a highest liquid level when the machining fluid supply tank is full is lower than a bottom surface of the machining tank. In an "immersion machining" in which the electric discharge machining is performed in a state that a work piece is completely immersed in the electric discharge machining fluid, when assuming that the machining tank is full and a prescribed amount of electric discharge machining fluid is circulated and supplied during the machining, it is necessary that the dirty fluid tank and the clear fluid tank respectively have at least the same capacity as the capacity of the machining tank. In addition, unless otherwise indicated, the capacity of each tank refers to a substantial maximum storage amount of each tank in the disclosure.

Therefore, even if a height of a tank wall of the machining fluid supply tank located lower than the machining tank can be the same as the height of a tank wall of the machining tank, it is calculated that an installation area of the machining fluid supply tank is necessarily two times larger than the bottom area of the machining tank. In practice, in order to prevent the electric discharge machining fluid from leaking out of the machining fluid supply tank, the capacity of the dirty fluid tank is larger than the capacity of the machining tank, the dirty fluid tank is not separated from the clear fluid tank and the surplus electric discharge machining fluid of the clear fluid tank can be returned to the dirty fluid tank so that the capacity of the clear fluid tank is smaller than that of the dirty fluid tank.

For example, patent literature 1 and patent literature 2 disclose an electric discharge machining device in which the clear fluid tank is superposed above the dirty fluid tank. The electric discharge machining device of patent literature 1 and patent literature 2 can decrease the installation area of the machining fluid supply tank with respect to the capacity. Besides, the electric discharge machining device of patent literature 1 and patent literature 2 can send the clear electric discharge machining fluid by the free-fall drop and shorten the time for supplying the electric discharge machining fluid. In the following, a method for sending the electric discharge machining fluid from the high-level clear fluid tank by the free-fall drop at once or a method for sending the electric discharge machining fluid from a plurality of supply pipelines at the same time is called a "dispatch" in the disclosure.

LITERATURE OF RELATED ART

Patent Literature

[Patent literature 1] Japanese Laid-Open No. 4-171123
[Patent literature 2] Japanese Utility Model Laid-Open No. 62-192827

An installation area of a machining fluid supply tank can be decreased by superposing a clear fluid tank on a dirty fluid tank, but because a capacity of the clear fluid tank is smaller than a capacity of a machining tank, an electric discharge machining fluid is insufficient and work efficiency of a fluid sending operation is reduced when the empty machining tank is fully filled. Besides, if the clear fluid tank is smaller, the amount of clear electric discharge machining fluid that is required to return to the dirty fluid tank increases temporarily in the stand-by duration, the dirty electric discharge machining fluid is mixed with the clear electric discharge machining fluid and the burden of disadvantageous purification operation for repurification becomes greater, a time required for the purification operation unnecessarily becomes longer and the work efficiency of the purification operation is reduced, and consumables are consumed in surplus.

In order to prevent a reduction of work efficiency of the liquid sending operation and the purification operation, the dirty fluid tank and the clear fluid tank are completely separated so that the clear electric discharge machining fluid does not return to the dirty fluid tank, and it is necessary that the capacity of the clear fluid tank is sufficiently larger than the capacity of the machining tank and the machining fluid supply tank inevitably becomes large. Especially, in a case of a large electric discharge machining device in which the capacity of the machining tank is, for example, more than 1500 liters, it is not safe to arrange the clear fluid tank of a large capacity in a high position, and the burden of maintenance operation including cleaning is increased if the clear fluid tank of a large capacity is in the high position.

SUMMARY

The disclosure is mainly directed to provide an electric discharge machining device, which suppresses the increase in the installation area of the machining fluid supply tank compared with the capacity of the machining tank and prevents the reduction in the work efficiency of the purification operation for regenerating clear electric discharge machining fluid. Besides, the disclosure is directed to provide an electric discharge machining device which prevents the reduction in the work efficiency of the liquid sending operation for fully filling the machining tank even if the electric discharge machining device is relatively large. Some advantages that can be obtained by the disclosure are specifically shown each time in a specific description of embodiments.

Means to Solve Problems

The electric discharge machining device of the disclosure includes a machining tank (10), a machining fluid supply tank (20) and a pipe (30). The machining tank (10) has a prescribed capacity capable of immersing a work piece (4) in an electric discharge machining fluid (F) and accommodating the work piece (4). The machining fluid supply tank (20) includes: a dirty fluid tank (20A) that has a capacity smaller than the machining tank (10); an intermediate tank (20B) that has a capacity smaller than the dirty fluid tank (20A), is arranged so as to selectively communicate with the dirty fluid tank (20A) with a partition wall (21) therebetween, and causes a surplus clear electric discharge machining fluid to overflow across the partition wall (21); and a clear fluid tank (20C) that has a capacity smaller than the intermediate tank (20B), is superposed above the dirty fluid tank (20A) and the intermediate tank (20B), and causes the surplus clear electric discharge machining fluid to overflow to the intermediate tank (20B); and the sum of capacities of the dirty fluid tank (20A) and the intermediate tank (20B) is larger than the capacity of the machining tank (10). The pipe (30) includes: a drain pipeline (30A) for discharging the electric discharge machining fluid in the machining tank (10) to the dirty fluid tank (20A) by a free-fall drop; a first pipeline (301) for purifying the dirty electric discharge machining fluid from the dirty fluid tank (20A) and sending the clear electric discharge machining fluid to the clear fluid tank (20C); and a second pipeline (302) for sending the clear electric discharge machining fluid from the clear fluid tank (20C) to the machining tank (10).

In an exemplary embodiment, in the electric discharge machining device of the disclosure, the capacity of the machining fluid supply tank (20) is 1.5-2 times of the capacity of the machining tank (10). Besides, a third pipeline (303) is provided which sends the clear electric discharge machining fluid from the intermediate tank (20B) to the clear fluid tank (20C) or directly to the machining tank (10).

In addition, the electric discharge machining device of the disclosure is provided with a communication passage (22) on a bottom side of the partition wall (21) and includes a switching device (23). The switching device (23) selectively communicates the communication passage (22) and operates so as to keep the communication passage (22) normally closed and to open the communication passage (22) during a period in which the clear electric discharge machining fluid is sent to the empty machining tank (10) until the machining tank (10) is fully filled to communicate the dirty fluid tank (20A) with the intermediate tank (20B). In an exemplary embodiment, a fourth pipeline (304) is provided which sends the clear electric discharge machining fluid from the dirty fluid tank (20A) directly to the machining tank (10).

In addition, the electric discharge machining device of the disclosure is provided with a communication passage (22) on the bottom side of the partition wall (21) and includes a switching device (23). The switching device (23) selectively communicates the communication passage (22) and operates so as to keep the communication passage (22) normally closed and to open the communication passage (22) during the machining to communicate the dirty fluid tank (20A) with the intermediate tank (20B). Besides, symbols in the above brackets are consistent with symbols of the drawings and are attached for the convenience of description. The disclosure is not limited to the electric discharge machining device of the embodiments shown in the drawings.

Effect

The electric discharge machining device of the disclosure includes the intermediate tank that can store the surplus clear electric discharge machining fluid of the clear fluid tank and completely separates the dirty fluid tank from the clear fluid tank, so that the work efficiency of the purification operation is not reduced. Besides, a required amount of clear electric discharge machining fluid with respect to the capacity of the machining tank can be prepared in the intermediate tank or the dirty fluid tank that selectively communicates with the intermediate tank, so that an extra time is not required for fully filling the machining tank and the work efficiency of the liquid sending operation is not reduced.

Besides, because the capacity of the clear fluid tank can be reduced to about half of the capacity of the machining tank, the clear fluid tank can be easily arranged in a high position and the increase in the installation area can be suppressed. As a result, in the electric discharge machining device of the disclosure, the installation area of the machining fluid supply tank is not large compared with the capacity of the machining tank, and the work efficiency of the purification operation and the liquid sending operation is not reduced.

DESCRIPTION OF THE EMBODIMENTS

Figure 1:
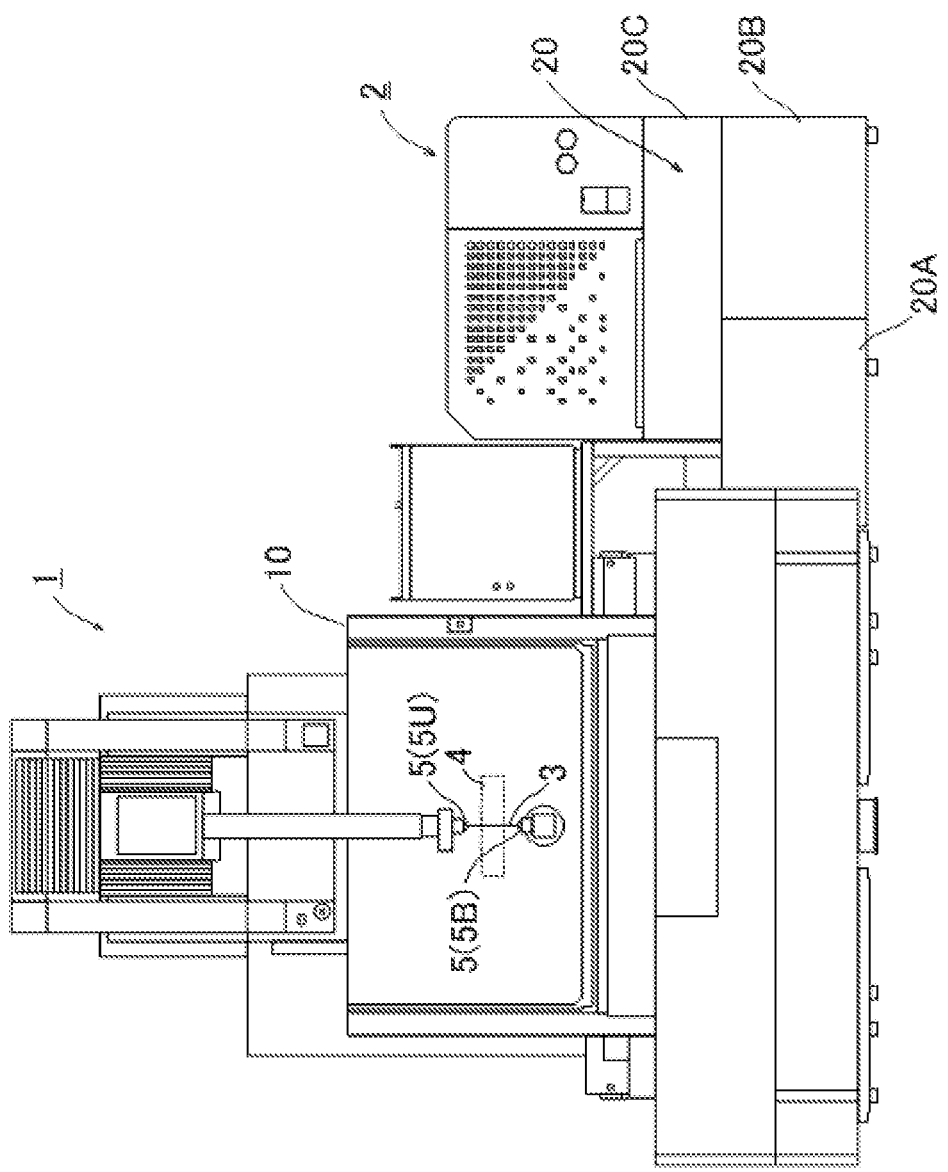
FIG. 1 is a front view showing an entire electric discharge machining device of the disclosure.

FIG. 1 is a front view showing an appropriate embodiment of an electric discharge machining device of the disclosure. The electric discharge machining device shown in FIG. 1 is a wire electric discharge machining device which uses an aqueous electric discharge machining fluid as a machining medium. FIG. 1 shows a state that a front door of a machining tank is fully open. FIGS. 2A to 2D schematically show outlines of a machining tank and a machining fluid supply tank, and may be different from an actual arrangement of the machining tank and the machining fluid supply tank. With reference to FIG. 1 and FIGS. 2A to 2D, the wire electric discharge machining device which is one of the embodiments of the disclosure is described below in detail.

The wire electric discharge machining device shown in FIG. 1 is provided with a machining fluid supply device 2 adjoining a machine body 1. The machine body 1 includes a machining tank 10. In the machining tank 10, a machining portion is arranged which includes a machining clearance formed between a wire electrode 3 and a work piece 4. The machining fluid supply device 2 includes a machining fluid supply tank 20. The machining fluid supply tank 20 is configured by a dirty fluid tank 20A, an intermediate tank 20B, and a clear fluid tank 20C.

In the wire electric discharge machining device shown in FIG. 1, unillustrated wire guides that guide and position the wire electrode 3 are arranged up and down to clamp the work piece 4. The wire guides are respectively incorporated into a guide assembly along with a machining fluid jet nozzle 5. The machining fluid jet nozzle 5 includes a machining fluid jet nozzle 5U arranged on an upper side and a machining fluid jet nozzle 5B arranged on a lower side which clamp the work piece 4. The machining fluid jet nozzle 5 injects the electric discharge machining fluid at a prescribed pressure toward the machining clearance coaxially with the wire electrode 3 that is stretched vertically with respect to an upper surface of the work piece 4 so as to supply a jet of the electric discharge machining fluid.

The machining tank 10 has a prescribed capacity capable of immersing the work piece 4 in the electric discharge machining fluid and accommodating the work piece 4. The machining tank 10 in the electric discharge machining device of the embodiment is arranged on a table reciprocating in an X-axis direction which is a horizontal axis direction, and the table is placed on a saddle reciprocating in a Y-axis direction which is another horizontal axis direction orthogonal to the X-axis direction. The machining tank 10 can move in the two horizontal axis directions at the same time.

The dirty fluid tank 20A of the machining fluid supply tank 20 has a capacity smaller than that of the machining tank 10. The dirty fluid tank 20A is arranged so that a liquid level when the dirty fluid tank 20A is full is lower than the bottom surface of the machining tank 10, and can collect the electric discharge machining fluid by allowing the electric discharge machining fluid in the machining tank 10 to fall freely. Therefore, there is an advantage that a time required for discharging all the electric discharge machining fluid from the machining tank 10 is considerably shorter compared with a case that the electric discharge machining fluid in the machining tank is pumped up and discharged by a pump in a way similar to a previous electric discharge machining device which collects a discharged liquid from the drain of the machining tank.

The intermediate tank 20B has a capacity smaller than the capacity of the dirty fluid tank 20A. The intermediate tank 20B is arranged to adjoin the dirty fluid tank 20A with the partition wall 21 therebetween, has a tank wall at substantially the same height as the dirty fluid tank 20A, and is disposed so that the liquid level when the intermediate tank 20B is full is lower than the bottom surface of the machining tank 10. The partition wall 21 dividing the dirty fluid tank 20A and the intermediate tank 20B has a height lower than the height of outer tank walls of the dirty fluid tank 20A and the intermediate tank 20B, and the surplus clear electric discharge machining fluid stored in the intermediate tank 20B can overflow across the partition wall 21 to be supplied to the dirty fluid tank 20A.

The intermediate tank 20B selectively communicates with the dirty fluid tank 20A with the partition wall 21 therebetween. When the dirty fluid tank 20A and the intermediate tank 20B communicate with each other, the electric discharge machining fluids in the dirty fluid tank 20A and the intermediate tank 20B freely flow in the communication passage 22 so that the heights of liquid surface of the electric discharge machining fluids stored in the dirty fluid tank 20A and the intermediate tank 20B are the same. The sum of capacities of the dirty fluid tank 20A and the intermediate tank 20B when the dirty fluid tank 20A and the intermediate tank 20B communicate with each other is larger than the capacity of the machining tank 10. Therefore, in terms of calculation, the electric discharge machining fluid does not overflow from the machining fluid supply tank 20 when the electric discharge machining fluid is completely discharged from the machining tank 10.

Figure 2A:
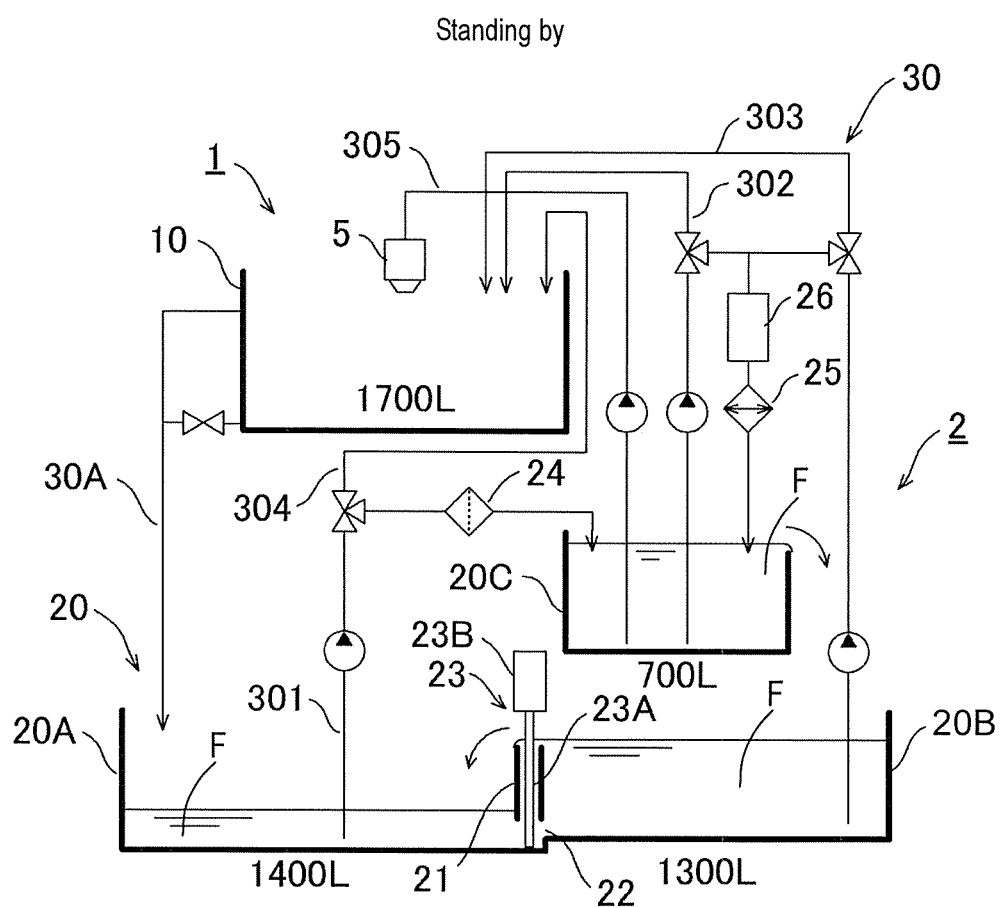
FIGS. 2A to 2D are block diagrams showing storage states of an electric discharge machining fluid in each tank of the disclosure.

In the machining fluid supply tank 20 of the electric discharge machining device of the embodiment, as shown in FIG. 2A, the communication passage 22 is provided on the bottom surface side of the partition wall 21, and a switching device 23 which opens and closes the communication passage 22 is arranged as means of selectively communicating the communication passage 22. Specifically, the switching device 23 mainly includes a plate-shaped switching door 23A like a shutter and a driving device 23B having a driving source like an air cylinder or an electric motor, and causes the switching door 23A to reciprocate up and down by the driving device 23B so as to selectively communicate the dirty fluid tank 20A and the intermediate tank 20B.

The switching device 23 normally lowers the switching door 23A and closes the communication passage 22. However, during a period that the clear electric discharge machining fluid is sent to the empty machining tank 10 until the machining tank 10 is full, the switching device 23 operates to raise the switching door 23A and open the communication passage 22 so as to communicate the dirty fluid tank 20A with the intermediate tank 20B. In addition, when the electric discharge machining fluid is hardly left in the dirty fluid tank 20A during the machining, the switching device 23 operates to raise the switching door 23A and open the communication passage 22 so as to communicate the dirty fluid tank 20A with the intermediate tank 20B.

The clear fluid tank 20C has a capacity smaller than that of the intermediate tank 20B. Specifically, the capacity of the clear fluid tank 20C is at least below 70% of the capacity of the machining tank 10, in an exemplary embodiment, below half of the capacity of the machining tank 10. In particular, in a case of a large electric discharge machining device in which the capacity of the machining tank 10 is large, if the capacity of the clear fluid tank 20C is not below half of the capacity of the machining tank 10, it is difficult to superpose the clear fluid tank 20C on the dirty fluid tank 20A. The clear fluid tank 20C is superposed above the dirty fluid tank 20A and the intermediate tank 20B, and can transfer the surplus clear electric discharge machining fluid by causing the surplus clear electric discharge machining fluid to overflow to the intermediate tank 20B located below.

The clear fluid tank 20C does not communicate with the dirty fluid tank 20A and is completely separated from the dirty fluid tank 20A. Therefore, the electric discharge machining fluid flowing into the intermediate tank 20B is the clear electric discharge machining fluid in which the impurities are removed, so that a repurification treatment is generally unnecessary and wasteful. In particular, when the machining fluid supply tank 20 is arranged in a way that the sum of capacities of the intermediate tank 20B and the clear fluid tank 20 is larger than the capacity of the machining tank 10, the clear electric discharge machining fluid can be sent from the intermediate tank 20B and the clear fluid tank 20C at the same time so that the clear electric discharge machining fluid can be dispatched to the empty machining tank 10.

A pipe 30 in the machining fluid supply device 2 includes a drain pipeline 30A, a first pipeline 301, and a second pipeline 302. Besides, the pipe 30 of the electric discharge machining device of the embodiment shown in FIGS. 2A to 2D includes a third pipeline 303, a fourth pipeline 304, and a fifth pipeline 305. The drain pipeline 30A is a liquid discharging pipeline, the first pipeline 301 is a circulation pipeline, and the second pipeline 302 to the fifth pipeline 305 are supply pipelines (liquid sending pipelines). In FIGS. 2A to 2D, members that are provided appropriately in a design of the pipe, such as a pipe including a return pipeline, a valve including a check valve or a safety valve, or a flowmeter, are omitted in the drawings.

The drain pipeline 30A is a pipeline which discharges the electric discharge machining fluid (F) in the machining tank 10 to the dirty fluid tank 20A by the free-fall drop. The drain pipeline 30A can adjust a flow rate of the electric discharge machining fluid (F) discharged from the machining tank 10 per unit time by changing the opening of a drain valve. The liquid surface of the electric discharge machining fluid (F) stored in the dirty fluid tank 20A is measured, and the opening of the drain valve is changed corresponding to the liquid level of the dirty fluid tank 20A, in other words, according to the amount of the electric discharge machining fluid (F) stored in the dirty fluid tank 20A; when the drain valve is fully opened, all the electric discharge machining fluid (F) in the machining tank 10 can be collected to the dirty fluid tank 20A at a shortest time.

In the electric discharge machining device of the embodiment, the capacity of the machining tank 10 is larger than the capacity of the dirty fluid tank 20A. However, because the electric discharge machining fluid (F) is sent from the dirty fluid tank 20A to the clear fluid tank 20C through the first pipeline 301 during a liquid discharge from the machining tank 10, if the total amount of the electric discharge machining fluid (F) that the entire machining fluid supply tank 20 can store changes from 1.5 times to about 2 times of the capacity of the machining tank, the electric discharge machining fluid (F) does not overflow from the dirty fluid tank 20A to the intermediate tank 20B even when the drain pipeline 30A is fully opened.

The first pipeline 301 is a pipeline which is provided with a filter 24 in the pipe and which removes the impurities from the dirty electric discharge machining fluid that is pumped from the dirty fluid tank 20A by a pump and that is sent toward the clear fluid tank 20C for purification and sends the clear electric discharge machining fluid to the clear fluid tank 20C.

The second pipeline 302 is a pipeline which sends the clear electric discharge machining fluid from the clear fluid tank 20C to the machining tank 10. In the machining fluid supply device 2 of the embodiment, the second pipeline 302 diverges on the way and the clear electric discharge machining fluid can be cooled to a prescribed temperature by a cooling device 25. Besides, the wire electric discharge machining device of the embodiment uses an aqueous electric discharge machining fluid as the machining medium, so that a water purifier 26 including an ion exchange resin is arranged in a diverged pipeline of the second pipeline 302 and the specific resistance of the electric discharge machining fluid stored in the clear fluid tank 20C is increased to and maintained at a prescribed value.

Arrangements of the cooling device 25 and the water purifier 26 are arbitrary as long as the clear electric discharge machining fluid of a prescribed specific resistance value at a prescribed temperature is sent to the machining tank 10. For example, the cooling device 25 and the water purifier 26 can be disposed in series without diverging from the second pipeline 302. Or a circulation pipeline including the cooling device 25 and the water purifier 26 can be separately arranged to be independent of the second pipeline 302.

The third pipeline 303 is a pipeline which sends the clear electric discharge machining fluid from the intermediate tank 20B to the clear fluid tank 20C or directly to the machining tank 10. In the machining fluid supply device 2 of the embodiment shown in FIGS. 2A to 2D, the third pipeline 303 is arranged so that the third pipeline 303 diverges on the way and the electric discharge machining fluid of the intermediate tank 20B can be selectively sent to the clear fluid tank 20C and the machining tank 10. The third pipeline 303 may be provided with only one of either the circulation pipeline which sends the electric discharge machining fluid from the intermediate tank 20B to the clear fluid tank 20C or the supply pipeline for dispatch which sends the electric discharge machining fluid from the intermediate tank 20B to the machining tank 10. Besides, the circulation pipeline and the supply pipeline may be arranged independently.

When the communication passage 22 is in a closed state, only the clear electric discharge machining fluid overflowing from the clear fluid tank 20C flows to the intermediate tank 20B and is stored. Accordingly, the clear electric discharge machining fluid can be supplied from the intermediate tank 20B directly or indirectly to the machining tank 10 even if the capacity of the clear fluid tank 20C is smaller than that of the machining tank 10, and thus the clear electric discharge machining fluid is not insufficient. Therefore, there is an advantage that the capacity of the clear fluid tank 20C can be decreased to about half of that of the machining tank 10 in a state that the dirty fluid tank 20A and the clear fluid tank 20C are separated completely and the purification operation and the liquid sending operation are excellent without increasing the installation area.

Because the electric discharge machining device of the embodiment has a configuration in which the clear electric discharge machining fluid can be supplied by overflowing from the intermediate tank 20B to the dirty fluid tank 20A in a state that a required amount of electric discharge machining fluid is stored in the intermediate tank 20B and the clear fluid tank 20C, all the electric discharge machining fluid stored in the machining fluid supply tank 20 and the dirty fluid tank 20A can be purified by continuously performing the purification treatment even after the intermediate tank 20B is full.

Therefore, when the clear electric discharge machining fluid is sent to the empty machining tank 10 in a case of a state that the stand-by duration is sufficiently obtained and all the electric discharge machining fluid is purified, if the communication passage 22 is selectively opened and the electric discharge machining fluid of the intermediate tank 20B is supplied to the dirty fluid tank 20A until the liquid level of the dirty fluid tank 20A is the same as the liquid level of the intermediate tank 20B, the clear machining fluid of the intermediate tank 20B can also be transferred to the clear fluid tank 20C even without the third pipeline 303, so that the clear electric discharge machining fluid is not insufficient and the capacity of the clear fluid tank 20C can be reduced to less than half of the capacity of the machining tank 10.

When the clear electric discharge machining fluid is supplied from the second pipeline 302 to the machining tank 10, the clear electric discharge machining fluid can be supplied from the intermediate tank 20B directly to the machining tank 10 through the third pipeline 303 at the same time. Therefore, in the electric discharge machining device of the embodiment, even if the capacity of the clear fluid tank 20C is about half of the capacity of the machining tank 10, a liquid sending amount per unit time can be increased to perform a dispatch and a liquid sending time until the empty machining tank 10 is full can be further shortened.

Accordingly, the electric discharge machining device of the embodiment can completely separate the dirty fluid tank 20A from the clear fluid tank 20C and decrease the capacity of the clear fluid tank 20C to less than half of the capacity of the machining tank 10, so that the work efficiency of the purification operation for purifying the electric discharge machining fluid is high and the work efficiency in the liquid sending time for filling the empty machining tank is not reduced.

For example, even in the machining fluid supply tank 20 having an installation area smaller than the installation area of a conventional machining fluid supply tank that can store the electric discharge machining fluid of about 1.5 times of the capacity of the machining tank and that disposes the dirty fluid tank and clear fluid tank side by side, the electric discharge machining fluid having an amount of up to about 2 times of the capacity of the machining tank 10 can be continuously purified and stored. Therefore, the clear electric discharge machining fluid having an amount of more than 2 times of the capacity of the clear fluid tank 20C is prepared in the stand-by duration and a continuous liquid sending can be performed so that the efficiency of the liquid sending operation is not reduced. Especially, even in a relatively large electric discharge machining device in which the capacity of the machining tank 10 is, for example, more than 1500 liters, the time until the machining tank 10 is full can be shortened.

The fourth pipeline 304 is a pipeline which directly sends the clear electric discharge machining fluid from the dirty fluid tank 20A to the machining tank 10 when all the electric discharge machining fluid stored in the machining fluid supply tank 20 including the dirty fluid tank 20A is substantially purified by the purification treatment of the electric discharge machining fluid in the stand-by duration. In the electric discharge machining device of the embodiment, the fourth pipeline 304 is arranged to diverge on the way from the first pipeline 301 because the fourth pipeline 304 is not used simultaneously with the first pipeline 301, but the fourth pipeline 304 can also be separately arranged to be independent of the first pipeline 301. The dispatch can be performed using the fourth pipeline 304 and the time until the empty machining tank 10 is full can be further shortened.

The fifth pipeline 305 is a pipeline which supplies the clear electric discharge machining fluid from the clear fluid tank 20C to a machining fluid jet nozzle 5 and supplies the clear electric discharge machining fluid from the machining fluid jet nozzle 5 to the machining clearance. The fifth pipeline 305 is unnecessary in an electric discharge machining device which does not use a machining fluid jet. In the electric discharge machining device of the embodiment, there is an advantage that the reduction of a machining accuracy can be suppressed by supplying the clear electric discharge machining fluid stored in the clear fluid tank 20C, for which the temperature and the specific resistance value are more strictly controlled compared with the electric discharge machining fluid stored in the intermediate tank 20B, directly to the machining clearance during the machining.

Figure 2B:
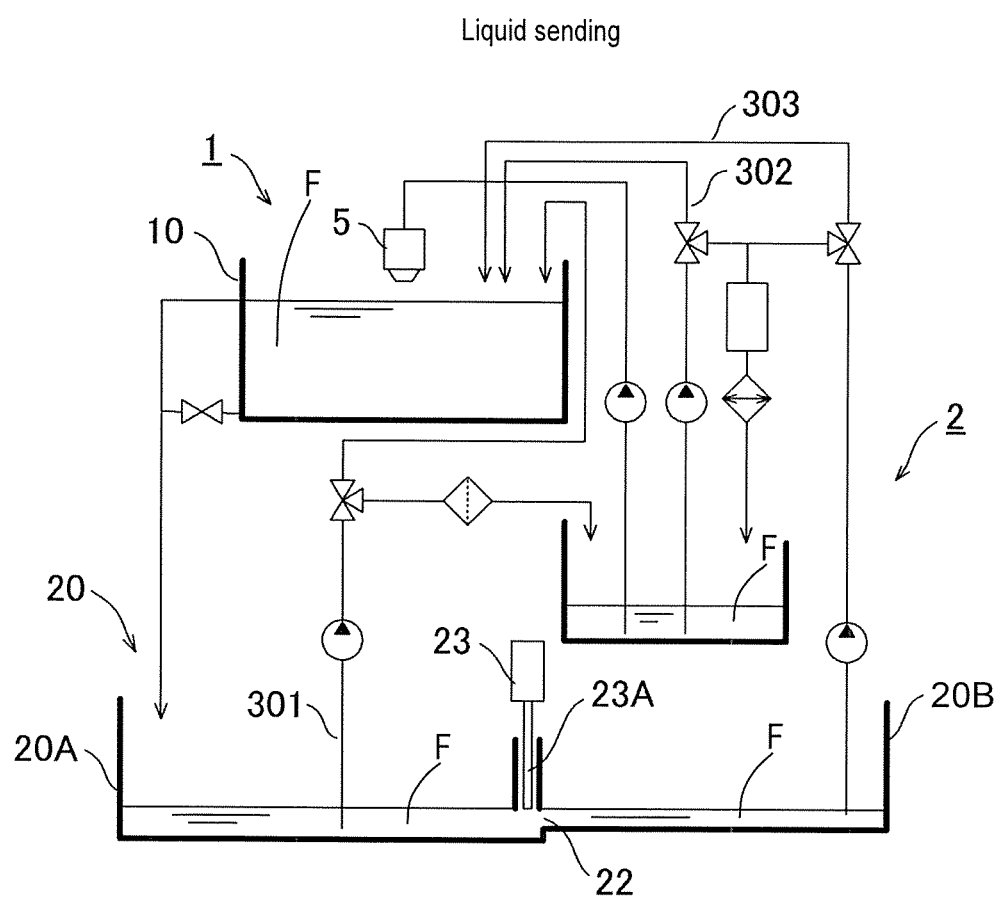
Figure 2C:
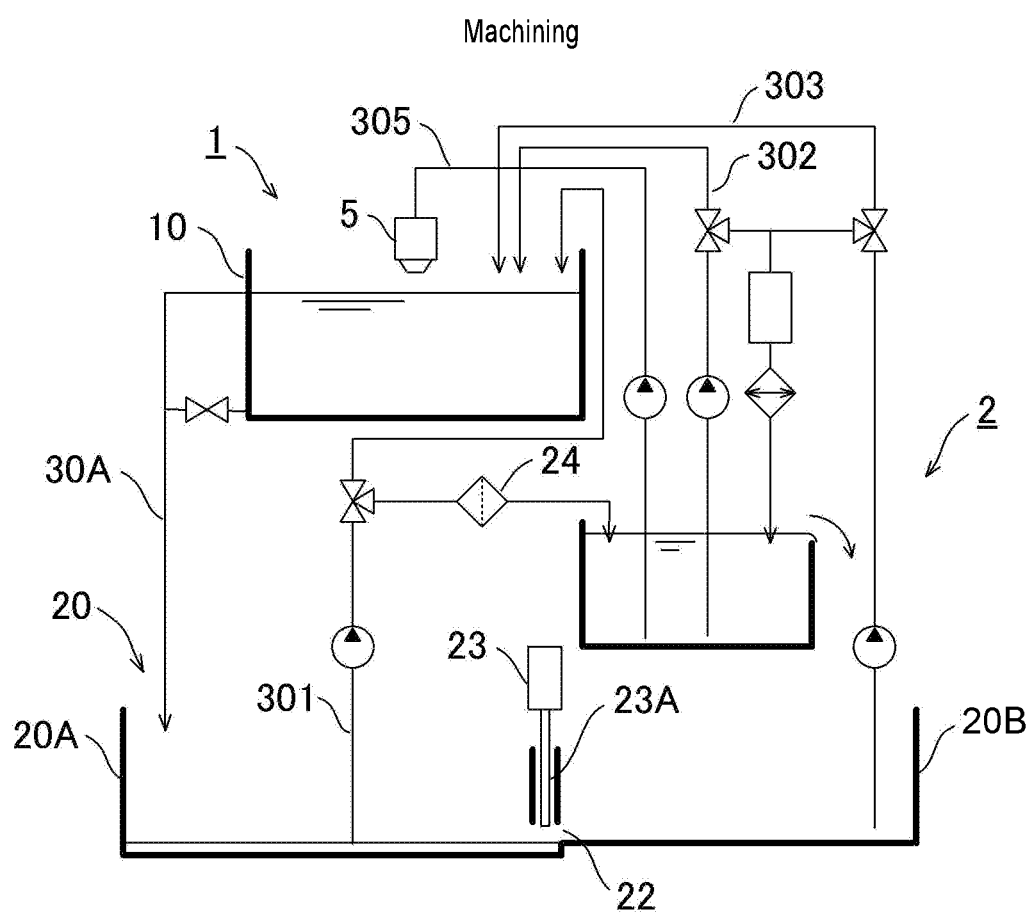
Figure 2D:
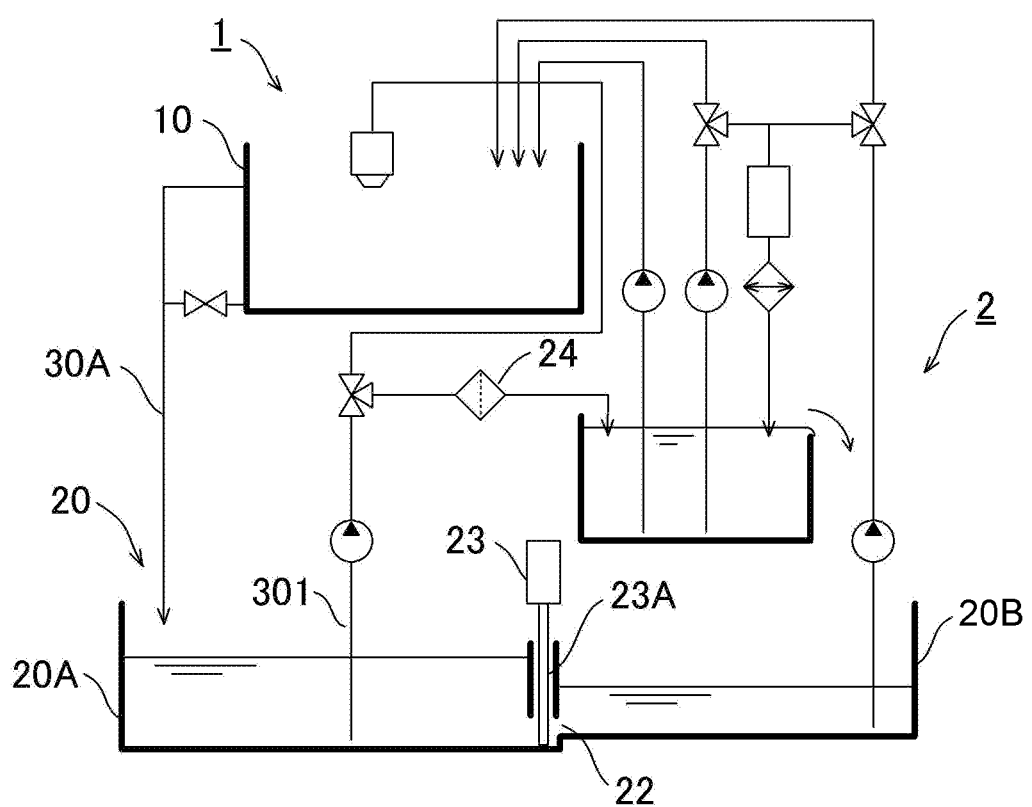
Figure 3:
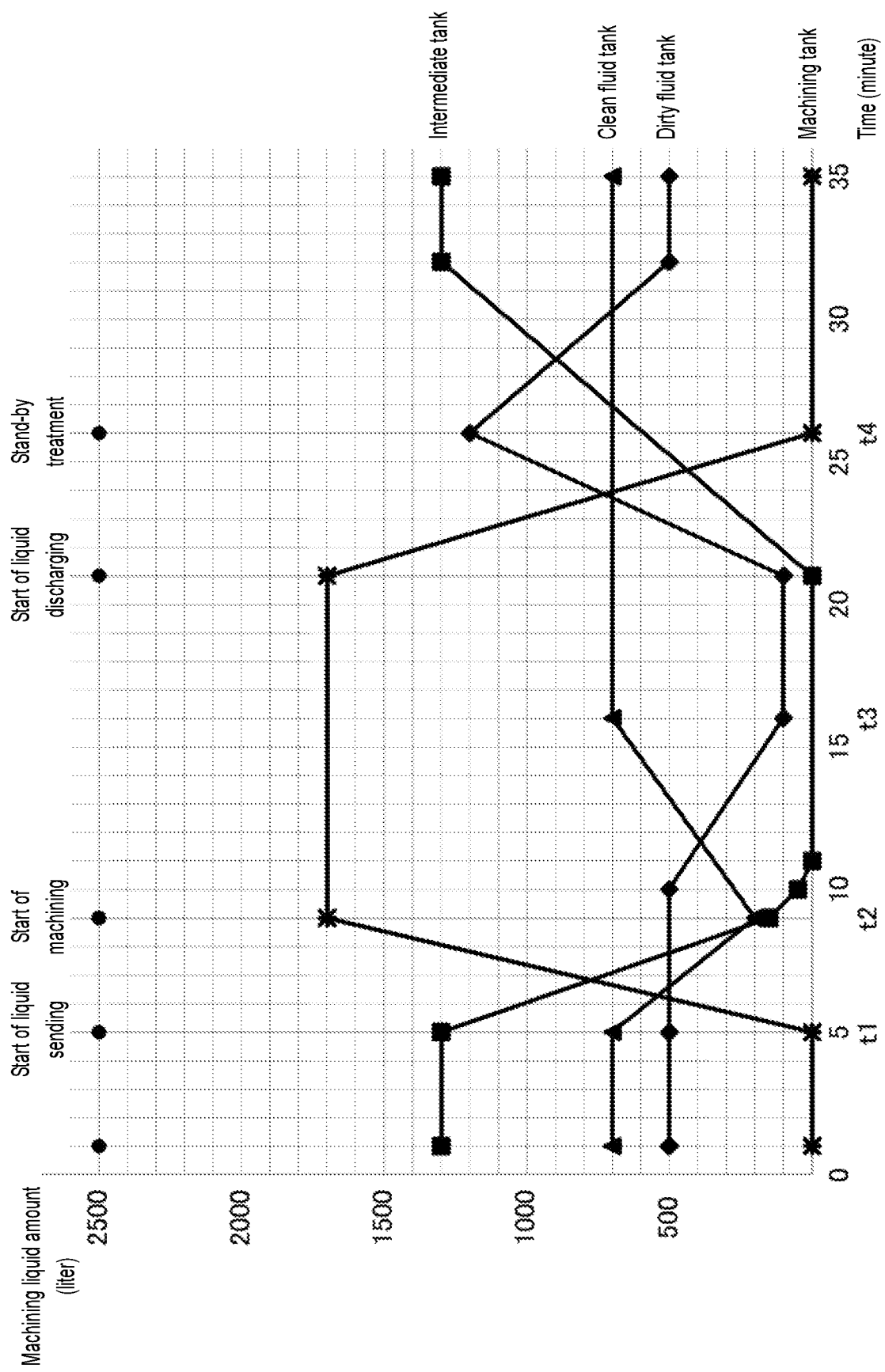
FIG. 3 is a timing chart showing a movement of the electric discharge machining fluid between each tank of the disclosure.

FIGS. 2A to 2D show storage states of the electric discharge machining fluid in the machining tank and the machining fluid supply tank. Besides, FIGS. 2A to 2D show operations of the machining fluid supply device. FIG. 3 is a diagram of operations of the supply of the electric discharge machining fluid and is a timing chart showing a movement of the electric discharge machining fluid between each tank. The operations of the machining fluid supply device are described below using FIGS. 2A to 2D and FIG. 3.

In the wire electric discharge machining device of the embodiment shown in FIGS. 2A to 2D, the capacity of the machining tank is set to 1700 liters; the total capacity of the machining fluid supply tank 20 is set to 3400 liters which is 2 times of that of the machining tank 10 with the capacity of the dirty fluid tank being set to 1400 liters, the capacity of the intermediate tank being set to 1300 liters, and the capacity of the clear fluid tank being set to 700 liters; the total amount of the electric discharge machining fluid to be used is set to 2500 liters which is about 1.5 times of the capacity of the machining tank 10; and the machining fluid supply device 2 is operated and a test working is performed according to the diagram shown in FIG. 3. In the test working, in order to measure the liquid sending time after an unspecified stand-by duration, a time is adjusted in a way that the fluid is sent to the empty machining tank 5 minutes after the beginning.

In the unspecified stand-by duration in which the purification treatment of the electric discharge machining fluid is performed in a state that power supplies of the machine body 1 and the machining fluid supply device 2 of the wire electric discharge machining device are on, as shown in FIG. 2A, only the circulation pipeline of the diverged pipeline of the first pipeline 301 and the second pipeline 302 in the pipe 30 is in an operation state, the switching door 23A of the switching device 23 which selectively communicate the dirty fluid tank 20A with the intermediate tank 20B keeps the communication passage 22 closed.

The machining fluid supply device 2 pumps up the electric discharge machining fluid from the dirty fluid tank 20A, purifies the dirty electric discharge machining fluid through the filter 24 and sends the clear electric discharge machining fluid to the clear fluid tank 20C. Besides, the clear electric discharge machining fluid stored in the clear fluid tank 20C is sent to the circulation pipeline which diverges from the second pipeline 302, and is maintained at a prescribed temperature and a prescribed specific resistance value by the cooling device 25 and the water purifier 26.

When the amount of the electric discharge machining fluid in the clear fluid tank 20C exceeds the capacity of the clear fluid tank 20C, the clear electric discharge machining fluid overflows to the intermediate tank 20B and is stored in the intermediate tank 20B. When the amount of the electric discharge machining fluid stored in the intermediate tank 20B exceeds the capacity of the intermediate tank 20B after a prescribed time has elapsed, the clear electric discharge machining fluid overflows to the dirty fluid tank 20A across the partition wall 21 and is supplied to the dirty fluid tank 20A.

When the electric discharge machining fluid overflows from the intermediate tank 20B to the dirty fluid tank 20A, an amount of clear electric discharge machining fluid necessary for filling the machining tank 10 has already been stored in the intermediate tank 20B and the clear fluid tank 20C. FIG. 2A shows a state of the machining tank 10 and the machining fluid supply tank 20 immediately before a time t1 shown in FIG. 3 when a required stand-by duration has elapsed. Furthermore, in the test working shown in FIG. 3, a measurement of liquid sending time is started after standing by until the electric discharge machining fluid stored the machining fluid supply tank 20 including the dirty fluid tank 20A is completely purified.

At the time t1 shown in FIG. 3, the clear electric discharge machining fluid capable of filling the machining tank 10 with the electric discharge machining fluid is stored in the intermediate tank 20B and the clear fluid tank 20C, so that the clear electric discharge machining fluid of the clear fluid tank 20C is sent from the second pipeline 302 and the clear electric discharge machining fluid of the intermediate tank 20B is sent from the third pipeline 303, and the liquid surface of the machining tank 10 can be increased to a limit liquid level at once. At this time, when sending of a "high-quality" clear electric discharge machining fluid in a state that the temperature and the specific resistance value are more strictly controlled is intended, a selection can be made to send only the clear electric discharge machining fluid of the clear fluid tank 20C from the second pipeline 302 instead of performing a dispatch.

In the electric discharge machining device of the embodiment, specifically, 2000 liters of the 2500 liters of the electric discharge machining fluid is stored in the intermediate tank 20B and the clear fluid tank 20C and only 500 liters is left in the dirty fluid tank 20A having a capacity of 1400 liters. At this time, in the duration of sending the electric discharge machining fluid to the machining tank 10, the switching door 23A of the switching device 23 is opened and the communication passage 22 is conducted, and the electric discharge machining fluid can freely move back and forth between the dirty fluid tank 20A and the intermediate tank 20B.

By preparing until all the electric discharge machining fluid stored in the machining fluid supply tank 20 is purified in the stand-by duration as the machining fluid supply device 2 of the embodiment does, the clear electric discharge machining fluid selectively stored in the dirty fluid tank 20A can also be sent from the fourth pipeline 304 and the time required for liquid sending can be further shortened. Accordingly, the electric discharge machining device of the embodiment is effective for a large electric discharge machining device having an even larger capacity of the machining tank 10.

In addition, in the machining fluid supply tank 20 of the embodiment, the bottom surface of the dirty fluid tank 20A is in a position slightly lower than the bottom surface of the intermediate tank 20B and the impurities precipitated at the bottom of the dirty fluid tank 20A are not mixed to the intermediate tank 20B. FIG. 2B shows a state that the machining tank 10 is full. As shown in FIG. 3, in a case of the dispatch, 1700 liters is sent for about 4 minutes and the machining tank 10 is fully filled from a time t2. Since the machining tank 10 is fully filled in about 9 minutes even when the dispatch is not performed, it turns out that even if the capacity of the clear fluid tank 20C is about half of that of the machining tank 10, the work efficiency of the liquid sending operation is hardly reduced compared with the conventional electric discharge machining device provided with a clear fluid tank 20C having the same capacity as the machining tank 10.

After the machining tank 10 is fully filled, in order to maintain the prescribed temperature and the specific resistance value of the electric discharge machining fluid intervening in the machining clearance and improve an effect of cleaning in the machining clearance in an assumed machining, the electric discharge machining fluid stored in the clear fluid tank 20C goes through the fifth pipeline 305 and the high-quality electric discharge machining fluid is injected and supplied from the machining fluid jet nozzle 5 directly to the machining clearance. Furthermore, in order to maintain an excellent state of the electric discharge machining fluid stored in the machining tank 10 to perform a high-precision machining, the high-quality electric discharge machining fluid stored in the clear fluid tank 20C can be continuously supplied to the machining tank 10 through the second pipeline 302 during the machining.

Accordingly, the surplus used electric discharge machining fluid overflows from the machining tank 10 and is discharged from the drain pipeline 30A to the dirty fluid tank 20A little by little during the machining. During the machining, the amount of the electric discharge machining fluid sent to the machining tank 10 is quite small when being compared in a ratio with respect to the total electric discharge machining fluid, and the clear fluid tank 20C is fully filled during the machining and the electric discharge machining fluid is hardly left in the dirty fluid tank 20A.

Specifically, since the clear fluid tank 20C is fully filled at a time t3 shown in FIG. 3, in order not to perform a wasteful purification treatment or an idle operation of the pump after time t3, the first pipeline 301 operates as necessary according to the height of the liquid surface, only the supply pipeline of the second pipeline 302 or the fifth pipeline 305 is constantly used and other pipelines are stopped. A storage state of the electric discharge machining fluid in the machining tank 10 and the machining fluid supply tank 20 at this time is shown in FIG. 2C.

When the machining is completed and the electric discharge machining fluid stored in the machining tank 10 is completely discharged, the liquid sending to the machining tank 10 is stopped, the switching door 23A of the switching device 23 is lowered to close the communication passage, and the drain valve is opened fully to completely discharge the used electric discharge machining fluid in the machining tank 10 to the dirty fluid tank 20A.

In the electric discharge machining device of the embodiment, in order to efficiently perform the purification treatment of the electric discharge machining fluid, with consideration of the maximum flow rate per unit time of the drain pipeline 30A and the flow rate per unit time of the first pipeline 301, the capacity of the machining fluid supply tank 20 is designed so that the capacity of the dirty fluid tank 20A is more than enough and the dirty fluid tank 20A is not filled even if the capacity of the dirty fluid tank 20A is smaller than that of the machining tank 10.

For example, at a time t4 in FIG. 3, when the machining tank 10 is empty as shown in FIGS. 2A to 2D, the dirty fluid tank 20A is not filled and the clear electric discharge machining fluid overflows to the intermediate tank 20B from the clear fluid tank 20C which is almost fully filled during the machining, but the dirty electric discharge machining fluid does not flow from the dirty fluid tank 20A to the intermediate tank 20B, and thus the work efficiency of the purification operation is not reduced.

In case an assumed undesirable situation such as a failure or damage of a pipe or pump occurs, the electric discharge machining fluid may exceed the capacity of the dirty fluid tank 20A, but the electric discharge machining fluid of the dirty fluid tank 20A overflows to the intermediate tank 20B across the partition wall 21 and the total capacity of the dirty fluid tank 20A and the intermediate tank 20B is larger than the capacity of the machining tank 10, and thus an accident that the dirty electric discharge machining fluid overflows from the machining fluid supply tank 20 can be prevented although the dirty electric discharge machining fluid is mixed to the intermediate tank 20B.

The disclosure is not limited to the wire electric discharge machining device of the embodiment. Although some specific examples have already been shown, variations are possible without departing from technical thoughts of the disclosure. In addition, the disclosure can be implemented in combination with other inventions. For example, the disclosure can be implemented in a die sinking electric discharge machining device which uses an oil-based electric discharge machining fluid mainly composed of oil as a machining medium.

INDUSTRIAL APPLICABILITY

The disclosure can be applied to an electric discharge machining device which uses an electric discharge machining fluid as a machining medium. In the electric discharge machining device of the disclosure, without increasing an installation area of an machining fluid supply tank more than necessary and reducing the work efficiency of purification operation of an electric discharge machining fluid, the empty machining tank can be fully filled at a relatively short time and the work efficiency of liquid sending operation is not reduced. The disclosure contributes to the development of the electric discharge machining device.

What is claimed is:

1. An electric discharge machining device comprising:
   a machining tank, having a prescribed capacity capable of immersing a work piece in an electric discharge machining fluid and accommodating the work piece;
   a machining fluid supply tank, comprising:
      a dirty fluid tank that has a capacity smaller than the machining tank;
      an intermediate tank that has a capacity smaller than the dirty fluid tank, is arranged so as to selectively communicate with the dirty fluid tank with a partition wall therebetween, and causes a surplus clear electric discharge machining fluid to overflow across the partition wall; and
      a clear fluid tank that has a capacity smaller than the intermediate tank, is superposed above the dirty fluid tank and the intermediate tank, and causes the surplus clear electric discharge machining fluid to overflow to the intermediate tank; and
   the capacity of each of the dirty fluid tank, the intermediate tank, and the clear fluid tank is a substantial maximum storage amount of the each of the dirty fluid tank, the intermediate tank, and the clear fluid tank,
   the sum of capacities of the dirty fluid tank and the intermediate tank is larger than the capacity of the machining tank; and
   a pipe, comprising:
      a drain pipeline for discharging the electric discharge machining fluid in the machining tank to the dirty fluid tank by a free-fall drop;
      a first pipeline for purifying the dirty electric discharge machining fluid from the dirty fluid tank and sending the clear electric discharge machining fluid to the clear fluid tank; and
      a second pipeline for sending the clear electric discharge machining fluid from the clear fluid tank to the machining tank.

2. The electric discharge machining device according to claim 1, wherein the capacity of the machining fluid supply tank is 1.5 times or more to 2 times or less of the capacity of the machining tank.

3. The electric discharge machining device according to claim 1, wherein a third pipeline is provided which sends the clear electric discharge machining fluid from the intermediate tank to the clear fluid tank or directly to the machining tank.

4. The electric discharge machining device according to claim 1, wherein a communication passage is provided on a bottom side of the partition wall, and a switching device is provided which selectively communicates the communication passage and operates so as to keep the communication passage normally closed and to open the communication passage during a period in which the clear electric discharge machining fluid is sent to the empty machining tank until the machining tank is fully filled to communicate the dirty fluid tank with the intermediate tank.

5. The electric discharge machining device according to claim 4, wherein a fourth pipeline is provided which sends the clear electric discharge machining fluid from the dirty fluid tank directly to the machining tank.

6. The electric discharge machining device according to claim 1, wherein a communication passage is provided on a bottom side of the partition wall, and a switching device is provided which selectively communicates the communication passage and operates so as to keep the communication passage normally closed and to open the communication passage during the machining to communicate the dirty fluid tank with the intermediate tank.

* * * * *